United States Patent [19]

Chang et al.

[11] Patent Number: 4,579,987

[45] Date of Patent: Apr. 1, 1986

[54] CATALYSIS OVER ACTIVATED HIGH SILICA ZEOLITES

[75] Inventors: Clarence D. Chang, Princeton; Joseph N. Miale, Lawrenceville, both of N.J.

[73] Assignee: Mobil Oil Corporation, New York, N.Y.

[21] Appl. No.: 733,337

[22] Filed: May 13, 1985

Related U.S. Application Data

[63] Continuation-in-part of Ser. No. 581,497, Feb. 17, 1984, Pat. No. 4,530,756, which is a continuation-in-part of Ser. No. 333,370, Dec. 22, 1981, Pat. No. 4,444,902.

[51] Int. Cl.$^4$ .......................... C07C 2/12; C07C 5/03; C07C 6/06; C07C 6/08
[52] U.S. Cl. .................................... 585/415; 585/530; 585/533; 585/722; 585/728; 208/117
[58] Field of Search ............... 585/415, 530, 533, 722, 585/728, 739, 741, 749; 208/117

[56] References Cited

U.S. PATENT DOCUMENTS

| | | | |
|---|---|---|---|
| 2,928,785 | 3/1960 | Hirschler | 208/117 |
| 3,456,034 | 7/1969 | Sanford et al. | 585/728 |
| 3,751,502 | 8/1973 | Hayes et al. | 585/739 X |
| 3,796,766 | 3/1974 | Hayes et al. | 585/739 X |
| 3,803,263 | 4/1974 | Schneider et al. | 585/739 |
| 3,932,554 | 1/1976 | Takase et al. | 585/739 |
| 4,347,395 | 8/1982 | Chu et al. | 585/420 |
| 4,374,296 | 2/1983 | Haag et al. | 585/739 |
| 4,465,884 | 8/1984 | Degnan et al. | 585/415 |

FOREIGN PATENT DOCUMENTS 0164732 9/1984 Japan .................. 585/415

*Primary Examiner*—John Doll
*Assistant Examiner*—O. Chaudhuri
*Attorney, Agent, or Firm*—Alexander J. McKillop; Michael G. Gilman; Dennis P. Santini

[57] ABSTRACT

A process is provided for converting feedstock comprising paraffins, olefins or mixtures thereof to product comprising $C_5+$ hydrocarbons over a catalyst comprising a high silica crystalline zeolite which has been treated by steps of calcining the crystalline material, contacting the calcined material with solid aluminum fluoride, and converting the aluminum fluoride contacted material to hydrogen form.

23 Claims, No Drawings

CATALYSIS OVER ACTIVATED HIGH SILICA ZEOLITES

CROSS-REFERENCE TO RELATED APPLICATIONS

This application is a continuation-in-part of application Ser. No. 581,497, filed Feb. 17, 1984, now U.S. Pat. No. 4,530,756, which was a continuation-in-part of application Ser. No. 333,370, filed Dec. 22, 1981, now U.S. Pat. No. 4,444,902.

FIELD OF THE INVENTION

This invention relates to a process for conversion of paraffins and/or olefins to $C_5+$ hydrocarbons, including aromatic hydrocarbons, over a catalyst comprising a high silica-containing crystalline material which has been treated by steps of calcining the crystalline material, contacting the calcined material with solid aluminum fluoride, and converting the aluminum fluoride contacted material to hydrogen form, such as, for example, by contact with a hydrogen ion precursor, e.g., an ammonium salt solution, and calcination.

BACKGROUND OF THE INVENTION

Zeolitic materials, both natural and synthetic, have been demonstrated in the past to have catalytic properties for various types of hydrocarbon conversions. Certain zeolitic materials are ordered, porous crystalline aluminosilicates having a definite crystalline structure within which there are a large number of smaller cavities which may be interconnected by a number of still smaller channels. Since the dimensions of these pores are such as to accept for adsorption molecules of certain dimensions while rejecting those of larger dimensions, these materials have come to be known as "molecular sieves" and are utilized in a variety of ways to take advantage of these properties.

Such molecular sieves, both natural and synthetic, include a wide variety of positive ion-containing crystalline aluminosilicates. These aluminosilicates can be described as a rigid three-dimensional framework of $SiO_4$ and $AlO_4$ in which the tetrahedra are cross-linked by the sharing of oxygen atoms whereby the ratio of the total aluminum and silicon atoms to oxygen is 1:2. The electrovalence of the tetrahedra containing aluminum is balanced by the inclusion in the crystal of a cation, for example, an alkali metal or an alkaline earth metal cation. This can be expressed wherein the ratio of aluminum to the number of various cations, such as Ca/2, Sr/2, Na, K or Li is equal to unity. One type of cation may be exchanged either entirely or partially by another type of cation utilizing ion exchange techniques in a conventional manner. By means of such cation exchange, it has been possible to vary the properties of a given aluminosilicate by suitable selection of the cation. The spaces between the tetrahedra are occupied by molecules of water prior to dehydration.

Prior art techniques have resulted in the formation of a great variety of synthetic aluminosilicates. These aluminosilicates have come to be designated by convenient symbols, as illustrated by zeolite ZSM-5 (U.S. Pat. No. 3,702,886).

The use of certain zeolites as catalyst components is taught in U.S. Pat. No. 4,305,808, for example.

High silica-containing zeolites are well known in the art and it is generally accepted that the ion exchange capacity of the crystalline zeolite is directly dependent on its aluminum content. Thus, for example, the more aluminum there is in a crystalline structure, the more cations are required to balance the electronegativity thereof, and when such cations are of the acidic type such as hydrogen, they impart tremendous catalytic activity to the crystalline material. On the other hand, high silica-containing zeolites having little or substantially no aluminum, have many important properties and characteristics and a high degree of structural stability such that they have become candidates for use in various processes including catalytic processes. Materials of this type are known in the art and include high silica-containing aluminosilicates such as ZSM-5, ZSM-11 (U.S. Pat. No. 3,709,979), and ZSM-12 (U.S. Pat. No. 3,832,449) to mention a few.

The silica-to-alumina ratio of a given zeolite is often variable; for example, zeolite X (U.S. Pat. No. 2,882,244) can be synthesized with a silica-to-alumina ratio of from 2 to 3; zeolite Y (U.S. Pat. No. 3,130,007) from 3 to about 6. In some zeolites, the upper limit of silica-to-alumina ratio is virtually unbounded. Zeolite ZSM-5 is one such material wherein the silica-to-alumina ratio is at least 5. U.S. Pat. No. 3,941,871 discloses a crystalline metal organo silicate essentially free of aluminum and exhibiting an x-ray diffraction pattern characteristic of ZSM-5 type aluminosilicate. U.S. Pat. Nos. 4,061,724; 4,073,865 and 4,104,294 describe microporous crystalline silicas or organo silicates wherein the aluminum content present is at impurity levels.

Because of the extremely low aluminum content of these high silica-containing zeolites, their ion exchange capacity is not as great as materials with a higher aluminum content. Therefore, when these materials are contacted with an acidic solution and thereafter are processed in a conventional manner, they are not as catalytically active as their higher aluminumcontaining counterparts.

In U.S. Pat. Nos. 3,960,978 and 4,021,502, Plank, Rosinski and Givens disclose conversion of $C_2-C_5$ olefins, alone or in admixture with paraffinic components, into higher hydrocarbons over crystalline zeolites having controlled acidity. Garwood et al. have also contributed improved processing techniques to the MOGD (Mobil Olefin to Gasoline and Distillate) system, as in U.S. Pat. Nos. 4,150,062, 4,211,640 and 4,227,992. The above identified disclosures are incorporated herein by reference.

Conversion of lower olefins, especially propene and butenes, over ZSM-5 is effective at moderately elevated temperatures and pressures. The conversion products are sought as liquid fuels, especially the $C_5+$ aliphatic and aromatic hydrocarbons. Olefinic gasoline is produced in good yield by the MOGD process and may be recovered as a product or recycled to the reactor system for further conversion to distillate-range products.

Olefinic feedstocks may be obtained from various sources, including fossil fuel processing streams, such as gas separation units, cracking of $C_2+$ hydrocarbons, coal byproducts, and various synthetic fuel processing streams. Cracking of ethane and conversion of conversion effluent is disclosed in U.S. Pat. No. 4,100,218 and conversion of ethane to aromatics over Ga-ZSM-5 is disclosed in U.S. Pat. No. 4,350,835. Olefinic effluent from fluidized catalytic cracking of gas oil or the like is a valuable source of olefins, mainly $C_3-C_4$ olefins, suitable for conversion according to the present process. Olefinic refinery streams which have been utilized in the past as feedstocks for alkylation processes may be advantageously converted to valuable higher hydrocarbons.

It is noted that U.S. Pat. Nos. 3,354,078 and 3,644,220 relate to treating crystalline aluminosilicates with volatile metal halides. Neither of these latter patents is, however, concerned with treatment of crystalline materials having a high silica-to-alumina mole ratio of at least 100.

SUMMARY OF THE INVENTION

The present invention relates to a novel process for converting $C_2$–$C_7$ paraffins, $C_2+$ olefins or mixtures thereof to $C_5+$ liquid hydrocarbons, including aromatic hydrocarbons over a catalyst comprising a zeolite of altered activity resulting from treating the zeolite in a special way. The treatment requires calcining the zeolite, contacting said calcined material with from about 0.1 to about 1 gram of solid aluminum fluoride per gram of crystalline zeolite at a temperature of from about 0° C. to about 650° C., and converting the aluminum fluoride contacted material to hydrogen form, such as by contact with an ammonium salt solution followed by calcination. The resulting zeolite material exhibits enhanced activity toward catalysis of the present process.

DESCRIPTION OF SPECIFIC EMBODIMENTS

Patents issuing from the parent applications of this application, i.e., U.S. Pat. Nos. 4,444,902 and 4,530,756, are incorporated entirely herein by reference.

The expression "high silica-containing crystalline material" is intended to define a crystalline structure which has an initial silica:alumina mole ratio greater than about 100:1, suitably greater than about 500:1, up to and including those highly siliceous materials where the initial silica:alumina mole ratio is infinity or as reasonably close to infinity as practically possible. This latter group of highly siliceous materials is exemplified by U.S. Pat. Nos. 3,941,871; 4,061,724; 4,073,865 and 4,104,294 wherein the materials are prepared from reaction solutions which involve no deliberate addition of aluminum. However, trace quantities of aluminum are present due to impurity of the reaction solutions. It is to be understood that the expression "high silica-containing crystalline material" also specifically includes those materials which have other metals besides aluminum associated therewith, such as boron, iron, chromium, etc. Thus, a requirement with regard to the zeolite starting materials utilized in the novel process of this invention is that they have an initial silica-to-alumina ratio greater than about 100 (irrespective of what other materials or metals are present in the crystal structure).

The zeolite starting materials utilized herein having an initial silica:alumina mole ratio greater than about 100:1 may be prepared from reaction mixtures containing sources of various cations. The present process provides noted improvement regardless of which cation sources are present in said reaction mixtures. Non-limiting examples of cation sources to be used in the manufacture of the zeolite starting materials include amines, diamines, pyrrolidine, onium compounds and compounds containing multiple cationic centers.

The process of treating the zeolite for use herein is simple and easy to carry out although the results therefrom are dramatic. The process involves calcining a high silica crystalline material having a silica:alumina ratio of at least 100:1, suitably at least 500:1, by heating the same at a temperature within the range of from about 200° C. to about 600° C. in an atmosphere such as air, nitrogen, etc. and at atmospheric, superatmospheric, or subatmospheric pressure for from about 1 minute to about 48 hours. The calcined zeolite is thereafter contacted with aluminum fluoride at a temperature of from about 0° C. to about 650° C., preferably from about 20° C. to about 550° C. It is noted that the melting point of aluminum fluoride is 1040° C. The aluminum fluoride treated zeolite may, if desired, be hydrolyzed by contact with water at a temperature of from about 20° C. to about 550° C. When the hydrolyzing temperature is below 100° C. at atmospheric pressure, liquid water may be used. When the boiling point of water is exceeded, such as when the hydrolyzing temperature exceeds 100° C. at atmospheric pressure, the zeolite may be purged with water saturated gas, e.g. helium. The aluminum fluoride contacted and, if desired, hydrolyzed zeolite is contacted with an ammonium salt solution, aqueous or non-aqueous, and thereafter calcined at a temperature of from about 200° C. to about 600° C. in an inert atmosphere of air, nitrogen, etc. at subatmospheric, atmospheric or superatomspheric pressures for from about 1 minute to about 48 hours.

Optionally, the zeolite may be calcined prior to ammonium salt solution contacting at a temperature of from about 200° C. to about 600° C. in an inert atmosphere for from about 1 minute to about 48 hours. Also, the ammonium salt solution contacted zeolite may be steamed, if desired, prior to the final calcination step. Such optional steaming step may be conducted at a temperature of from about 450° C. to about 550° C., with 20 to 100% steam, for from about 15 minutes to about 24 hours. If the optional steaming step is used, the steamed zeolite may, if desired, be again contacted with an aqueous or non-aqueous ammonium salt solution prior to final calcination.

In short, the following list of activation steps will be followed by the present method:
1. calcination
2. $AlF_3$ contact
3. optional hydrolysis
4. optional calcination
5. $NH_4^+$ contact
6. optional steaming
7. optional $NH_4^+$ contact
8. calcination The amount of aluminum fluoride which is utilized in the aluminum fluoride contacting step is not narrowly critical but usually from about 0.1 to about 1 gram of aluminum fluoride is used per gram of high silica crystalline material. The aluminum fluoride may be provided as a precipitate in solution with the zeolite, such as when the zeolite is mixed with an aqueous solution of an aluminum salt, e.g. $NaAlO_2$ or $Al(NO_3)_3$, followed by addition to the mixture of a source of fluoride ions, e.g. $NH_4F$ in excess. In this fashion, the aluminum of the salt is converted to $AlF_3$ in solution.

The ammonium salt solution contacting step may be conducted with an aqueous solution of an ammonium salt, e.g. $NH_4NO_3$, for a period of time of from about 1 hour to about 20 hours at a temperature of from ambient to about 100° C. The ammonium salt used is not narrowly critical and will normally be an inorganic salt such as ammonium nitrate, ammonium sulfate, ammonium chloride, etc. It may also be conducted in non-aqueous fashion under the same contact conditions such as when the ammonium salt is provided in a saturated alcohol solvent solution. The alcohol solvents useful for this include, as non-limiting examples, ethanol, propanol, butanol and mixtures thereof.

Hydrolysis and the ammonium salt solution contacting steps may be conducted simultaneously when the ammonium salt solution is aqueous. In any event, the benefits gained by the ammonium salt contacting step are realized subsequent to the aluminum fluoride contacting step and prior to final calcination.

Of the zeolite materials advantageously used in accordance herewith, those having the structure of ZSM-5, ZSM-11, ZSM-5/ZSM-11 intermediate, ZSM-12, ZSM-23, ZSM-35, ZSM-38 and ZSM-48 are particularly noted. ZSM-5 is described in U.S. Pat. Nos. 3,702,886 and Re. 29,948, the entire contents of each being hereby incorporated by reference herein. ZSM-11 is described in U.S. Pat. No. 3,709,979, the entire teaching of which is incorporated herein by reference. ZSM-5/ZSM-11 intermediate is described in U.S. Pat. No. 4,229,424, the entire teaching of which is incorporated herein by reference. ZSM-12 is described in U.S. Pat. No. 3,832,449, the entire contents of which are incorporated herein by reference. ZSM-23 is described in U.S. Pat. No. 4,076,842, the entire teaching of which is incorporated herein by reference. The entire contents of U.S. Pat. Nos. 4,016,245 and 4,046,859, describing ZSM-35 and ZSM-38, respectively, are incorporated herein by reference. ZSM-48 is described in U.S. Pat. No. 4,397,827, the entire teaching of which is incorporated herein by reference.

The feedstock to the present process comprises $C_2-C_7$ paraffins and/or olefins of at least two carbon atoms. When the feedstock comprises paraffins, product comprises aromatics, e.g., benzene, toluene and xylenes, and conversion conditions include a temperature of from about 100° C. to about 700° C., a pressure of from about 10 kPa to about 11000 kPa, preferably from 10 kPa to 7000 kPa, a liquid hourly space velocity (LHSV) of from about 0.1 $hr^{-1}$ to about 500 $hr^{-1}$, preferably from 0.5 $hr^{-1}$ to 400 $hr^{-1}$, and a hydrogen/hydrocarbon mole ratio of from 0 (no added hydrogen) to about 20. Under these same conversion conditions, a feedstock comprising $C_2-C_7$ olefins is converted to product comprising aromatics, e.g., benzene, toluene and xylenes.

A feedstock to the present process may comprise primarily $C_2-C_7$ olefins for conversion to gasoline and distillate products when the conversion conditions are tailored to be within the following ranges. In general, the temperature will be maintained at from about 190° C. to about 375° C., the pressure at from about 400 kPa to about 11000 kPa, preferably from 400 kPa to about 7000 kPa, and the liquid hourly space velocity (LHSV based on feedstock olefin) at from about 0.3 to about 2, preferably from 0.5 to 2 $hr^{-1}$. Specifically when the present process is operated in the distillate mode, the temperature will be from about 190° C. to about 315° C., the pressure from about 4200 kPa to about 11000 kPa, preferably from 4200 kPa to 7000 kPa, and the LHSV from about 0.3 to about 1.0 $hr^{-1}$, preferably from 0.5 to 1.0 $hr^{-1}$. When the present process is operated in the gasoline mode, the temperature will be from about 230° C. to about 375° C., the pressure from about 400 kPa to about 4700 kPa, preferably from 400 kPa to 3000 kPa and the LHSV from about 0.3 to about 2.0, preferably from 0.5 to 2.0 $hr^{-1}$. The feedstocks, products, process conditions and other variables for conversion of olefins to higher hydrocarbons are detailed in U.S. Pat. No. 4,456,779, incorporated entirely herein by reference.

In practicing a particularly desired chemical conversion process, it may be useful to composite the above-described activity enhanced crystalline zeolite with matrix comprising material resistant to the temperature and other conditions employed in the process. Such matrix material is useful as a binder and imparts additional resistance to the catalyst for the severe temperature, pressure and reactant feed stream velocity conditions encountered in many processes. The composite may be in the form of an extrudate.

Useful matrix materials include both synthetic and naturally occurring substances, as well as inorganic materials such as clay, silica and/or metal oxides. The latter may be either naturally occurring or in the form of gelatinous precipitates or gels including mixtures of silica and metal oxides. Naturally occurring clays which can be composited with the zeolite include those of the montmorillonite and kaolin families which include the subbentonites and the kaolins commonly known as Dixie, McNamee, Georgia and Florida clays or others in which the main mineral constituent is halloysite, kaolinite, dickite, nacrite or anauxite. Such clays can be used in the raw state as originally mined or initially subjected to calcination, acid treatment or chemical modification.

In addition to the foregoing matrix materials, the catalyst employed herein may be composited with a porous matrix material such as alumina, silica-alumina, silica-magnesia, silica-zirconia, silica-thoria, silica-beryllia, and silica-titania, as well as ternary compositions, such as silica-alumina-thoria, silica-alumina-zirconia, silica-alumina-magnesia and silica-magnesia-zirconia. The matrix may be in the form of a cogel. The relative proportions of activity enhanced zeolite component and matrix, on an anhydrous basis, may vary widely with the zeolite content of the dry composite ranging from about 1 to about 99 percent by weight and more usually in the range of about 5 to about 80 percent by weight.

The following examples will illustrate the novel method of the present invention.

EXAMPLE 1

A high silica-containing zeolite ZSM-5 having a silica-to-alumina mole ratio of about 26,000:1 (65 ppm framework alumina, 110 ppm bulk alumina and 0.23 percent sodium) was calcined for 30 minutes at 538° C.

EXAMPLE 2

A high silica-containing zeolite ZSM-5 having a silica-to-alumina mole ratio of about 30,000:1 was calcined for 30 minutes at 538° C.

EXAMPLE 3

A two gram sample of the calcined zeolite from Example 1 was impregnated with 163 milligram of NaAlO$_2$ (Baker's; 65% NaAlO$_2$, 15-20% NaOH; Assay 33.2% Na, 57.1% Al$_2$O$_3$ and 84.5% ash) dissolved in 1 milliliter water. The impregnated material was dried for 1 hour at 130° C. To the dried material was added 6 milliliters of aqueous solution containing 0.4 gram NH$_4$F which was a large enough excess to convert all aluminum from the NaAlO$_2$ to AlF$_3$. The total solution was placed in an ultrasonic bath for 1 minute, washed three times with 20 milliliters of water, and then dried at 130° C. The product was then calcined overnight at atmospheric pressure and 650° C. The calcined material was then exchanged with 1N NH$_4$NO$_3$ solution, steamed at 450° C. for 22 hours (100% steam) and then again exchanged with 1N NH₄NO₃ solution. The resulting product zeolite was again calcined as above.

EXAMPLE 4

A 1/16th inch extrudate was made comprising 35 weight percent alumina binder and 65 weight percent ZSM-5 zeolite made in Example 2. The extrudate was calcined in a muffle furnace at 538° C.

EXAMPLE 5

An aliquot of the calcined zeolite of Example 4 was refluxed in 1N Al(NO₃)₃ for three hours, filtered and dried at 130° C. The aliquot portion was then impregnated with an excess of NH₄F solution and filtered. The excess NH₄F was sufficient to cause precipitation in the solution of AlF₃. The wet filter cake was then dried at 130° C. and treated with aqueous solution of NH₄NO₃ (1N). The resulting product zeolite was calcined as above.

EXAMPLE 6

An sample of the zeolite made in Example 1 was treated with 1N NH₄NO₃ and calcined at 538° C.

EXAMPLE 7

A 2 gram sample of the calcined zeolite of Example 6 was impregnated with a solution containing 2 grams Al(NO₃)₃.9H₂O, dried at 130° C. and then treated with an excess of NH₄F (sufficient for formation of AlF₃ precipitate). The product was hydrolyzed with hot water and then treated with a non-aqueous saturated NH₄NO₃/ethanol solution. After drying, the product was calcined for six hours at 650° C. and then again exchanged with 1N NH₄NO₃ solution. The final product zeolite was calcined at 538° C.

EXAMPLE 8

The product zeolites of Examples 1, 3, 4, 5, 6 and 7 were evaluated for acid activity by the Alpha Test and/or CPI (cyclopropane isomerization) Test. The results of these tests are listed below:

| Zeolite Product Example Number | Alpha Value | CPI Value |
|---|---|---|
| 1 | 0.015 | 1[1] |
| 3 | 1.9 | 450[2] |
| 4 | 0.2 | — |
| 5 | 55 | — |
| 6 | 0.015 | 1 |
| 7 | 2.1 | 130 |

[1]Estimated value
[2]Extensive olefin oligomerization also observed.

It is observed from this that Alpha Values were enhanced by the present method from 0.015 to 1.9, from 0.2 to 55 and from 0.015 to 2.1, respectively. CPI values were enhanced from 1 to 450 and from 1 to 130, respectively. It is also noted that mere ion-exchange of the high silica material of Example 1 produced no activity enhancement (Example 6).

EXAMPLE 9

For comparison purposes, a 2 gram sample of the calcined zeolite of Example 6 was impregnated with 450 milligrams of anhydrous AlCl₃ dissolved in solvent alcohol (95% ethanol and 5% isopropyl alcohol) and calcined at 538° C. for 16 hours in air. One half of the resultant product was hydrolyzed in water and calcined at 538° C. The second half was treated with 1N NH₄NO₃, washed, dried at 130° C. and then calcined at 538° C.

The two products of this example were evaluated as was done for the product zeolites of Examples 6 and 7. The results are listed below:

| Zeolite Product of Example Number | Alpha Value | CPI Value |
|---|---|---|
| 6 | 0.015 | 1 |
| 7 | 2.1 | 130 |
| 9 First Half | 2.5 | 88 |
| 9 Second Half | 0.4 | — |

As is known in the art, the acid catalytic activity of a zeolite may be measured by its "alpha value", which is the ratio of the rate constant of a test sample for cracking normal hexane to the rate constant of a standard reference catalyst. Thus, an alpha value=1 means that the test sample and the standard reference have about the same activity. The alpha test is described in U.S. Pat. No. 3,354,078 and in *The Journal of Catalysis*, Vol. IV, pp. 527-529 (August 1965), each incorporated herein as to that description. The relationship of alpha value to the intrinsic rate constants of other acid-catalyzed reactions, such as that of the present invention, is detailed in *Nature*, Vol. 309, pp. 589-591, June 14, 1984, incorporated herein by reference as to that detail.

The CPI Index is a measure of the isomerization activity of a particular catalyst. The test involves measuring the rate of cyclopropane isomerization over the test catalyst and comparing it against silica-alumina (46 A.I.) as a reference standard. The test procedure involves utilizing a 5 to 250 mg. catalyst sample having a particle size of 20 to 200 mesh and mixing the same with about 1 ml of Vycor chips. The mixture is loaded into a 5 mm inside diameter Vycor reactor tube which is heated in air at a flow rate of 150 ml per minute to 538° C. and maintained there for 30 minutes. The sample is then cooled to 250° C. in helium at a flow rate of 12-80 ml per minute. Cyclopropane (helium/cyclopropane, 4, vol. to vol.) is then introduced and the reactor effluent analyzed by gas chromatographic techniques. The contact time is adjusted to keep the conversion within 0.5 to 50%. Since it is well known in the literature that the isomerization of cyclopropane is first order, rate constants may be determined at several temperatures to check for diffusional limitations. Using the above technique, the first order rate content for the standard 46 A.I. silica-alumina catalyst is 63.3 seconds$^{-1}$ at 250° C. This value was arbitrarily assigned an index of 1,000 so as to serve as a reference value. Thus, for example, the cyclopropane index (CPI Index) for a candidate catalyst with a first order rate constant of 0.633 would be determined as follows:

$$\frac{1,000 \times 0.633}{63.3} = 10$$

EXAMPLE 10

To demonstrate the present invention, a 2 gram sample of calcined product from Example 7 is placed in a reactor vessel and contacted with feedstock comprised of propylene at 230° C., 10,339 kPa and 0.38 hr$^{-1}$ (LHSV). Conversion of propylene is measured to be 83.5 wt. % with the product comprised of 46%

30°–330° F. b.p. material, 51 wt. % 330°–650° F. b.p. material and 3 wt. % 650 F+ b.p. material.

EXAMPLE 11

A feedstock of one-half propane and one-half butane is passed through the reactor vessel containing 2 grams of freshly calcined product from Example 3 at a temperature of 400° C., a pressure of 1000 kPa and a liquid hourly space velocity of 50 hr$^{-1}$. Product comprising benzene, toluene and xylenes is observed with conversion of feedstock paraffins measured at about 50%.

What is claimed is:

1. A process for converting a feedstock comprising $C_2+$ olefins, $C_2$–$C_7$ paraffins or a mixture thereof to conversion product comprising $C_5+$ hydrocarbon compounds which comprises contacting said feedstock at conversion conditions with a catalyst composition comprising a crystalline zeolite having an initial silica:alumina mole ratio of at least about 100:1 prepared by a method which comprises calcining the zeolite at a temperature of from about 200° C. to about 600° C. for a period of time ranging from about 1 minute to about 48 hours, contacting said calcined zeolite with from about 0.1 to about 1 gram of solid aluminum fluoride per gram of zeolite at a temperature of from about 0° C. to about 650° C., and converting said aluminum fluoride contacted zeolite to hydrogen form.

2. The process of claim 1 wherein said zeolite has an initial silica:alumina mole ratio greater than about 500:1.

3. The process of claim 1 wherein said conversion of said aluminum fluoride contacted zeolite to the hydrogen form comprises contact of said zeolite with a hydrogen ion precursor solution followed by calcination.

4. The process of claim 3 wherein said hydrogen ion precursor solution is an ammonium salt solution.

5. The process of claim 1 wherein said zeolite has the structure of ZSM-5, ZSM-11, ZSM-5/ZSM-11 intermediate, ZSM-12, ZSM-23, ZSM-35, ZSM-38 or ZSM-48.

6. The process of claim 5 wherein said zeolite has the structure of ZSM-5 or ZSM-11.

7. The process of claim 4 wherein said ammonium salt solution is ammonium nitrate.

8. The process of claim 1 which comprises an additional step of hydrolyzing said zeolite subsequent to said aluminum fluoride contacting step.

9. The process of claim 6 which comprises an additional step of hydrolyzing said zeolite subsequent to said aluminum fluoride contacting step.

10. The process of claim 3 which comprises an additional step of steaming said zeolite subsequent to said contact with hydrogen ion precursor solution and prior to said calcination.

11. The process of claim 1 wherein said aluminum fluoride is provided as a precipitate in solution with said zeolite from the reaction of an aluminum salt and a source of fluoride ions.

12. The process of claim 1 wherein said catalyst composition is in the form of an extrudate.

13. The process of claim 1 wherein said conversion conditions include a temperature of from about 100° C. to about 700° C., a pressure of from about 10 kPa to about 11000 kPa, a weight hourly space velocity of from about 0.1 hr$^{-1}$ to about 500 hr$^{-1}$ and a hydrogen/hydrocarbon mole ratio of from 0 to about 20.

14. A process for converting a feedstock comprising $C_2$–$C_7$ olefins to conversion products comprising $C_5+$ hydrocarbon compounds which comprises contacting said feedstock at conversion conditions with a catalyst composition comprising a crystalline zeolite having an initial silica:alumina mole ratio of at least about 100:1 prepared by a method which comprises calcining the zeolite at a temperature of from about 200° C. to about 600° C. for a period of time ranging from about 1 minute to about 48 hours, contacting said calcined zeolite with from about 0.1 to about 1 gram of solid aluminum fluoride per gram of zeolite at a temperature of from about 0° C. to about 650° C., and converting said aluminum fluoride contacted zeolite to hydrogen form.

15. The process of claim 14 wherein said zeolite has an initial silica:alumina mole ratio greater than about 500:1.

16. The process of claim 14 wherein said conversion of said aluminum fluoride contacted zeolite to the hydrogen form comprises contact of said zeolite with a hydrogen ion precursor solution followed by calcination.

17. The process of claim 16 wherein said hydrogen ion precursor solution is an ammonium salt solution.

18. The process of claim 14 wherein said zeolite has the structure of ZSM-5, ZSM-11, ZSM-5/ZSM-11 intermediate, ZSM-12, ZSM-23, ZSM-35, ZSM-38 or ZSM-48.

19. The process of claim 18 wherein said zeolite has the structure of ZSM-5 or ZSM-11.

20. The process of claim 14 wherein said catalyst composition is in the form of an extrudate.

21. The process of claim 14 wherein said conversion conditions include a temperature of from about 190° C. to about 375° C., a pressure of from about 400 kPa to about 11000 kPa and a liquid hourly space velocity of from about 0.3 hr$^{-1}$ to about 2 hr$^{-1}$.

22. The process of claim 21 wherein said conversion conditions include a temperature of from about 190° C. to about 315° C., a pressure of from about 4200 kPa to about 11000 kPa and a liquid hourly space velocity of from about 0.3 hr$^{-1}$ to about 1 hr$^{-1}$.

23. The process of claim 21 wherein said conversion conditions include a temperature of from about 230° C. to about 375° C., a pressure of from about 400 kPa to about 4700 kPa and a liquid hourly space velocity of from about 0.3 hr$^{-1}$ to about 2 hr$^{-1}$.

* * * * *